United States Patent
Oppenheim et al.

[15] 3,683,731
[45] Aug. 15, 1972

[54] AUTOMATIC MATERIAL CUTTING MACHINE AND METHOD

[72] Inventors: Henry Oppenheim, 30 Tanners Rd., Lake Success, N.Y. 11040; Jonas Walker, 22 Dr. Frank Rd., Spring Valley, N.Y. 10977

[22] Filed: June 19, 1970

[21] Appl. No.: 47,765

Related U.S. Application Data

[60] Division of Ser. No. 756,271, Aug. 29, 1968, Pat. No. 3,587,378, which is a continuation-in-part of Ser. No. 583,615, Oct. 3, 1966, abandoned, which is a continuation-in-part of Ser. No. 329,022, Dec. 9, 1966, abandoned.

[52] U.S. Cl............................................83/56, 83/71
[51] Int. Cl. ................................................B26d 5/30
[58] Field of Search..83/71, 56, 201, 201.04, 201.07, 83/565

UNITED STATES PATENTS

| 3,350,969 | 11/1967 | Wiatt et al. | 83/201.07 |
| 3,350,970 | 11/1967 | Glastra | 83/201.07 |
| 1,172,059 | 2/1916 | Scheyer | 83/71 |
| 3,347,121 | 10/1967 | Wiatt | 83/71 |
| 3,370,492 | 2/1968 | Treff | 83/71 |
| 3,245,295 | 4/1966 | Mueller | 83/56 |

*Primary Examiner*—Andrew R. Juhasz
*Assistant Examiner*—James F. Coan
*Attorney*—Kane, Dalsimer, Kane, Sullivan and Kurucz

[57] ABSTRACT

A machine and method for automatically cutting substantially flat material in a predetermined pattern in response to remote control signals in which the material to be cut is supported in slidable engagement with an underlying surface having an opening through which a cutting element can project to engage and cut said material.

5 Claims, 13 Drawing Figures

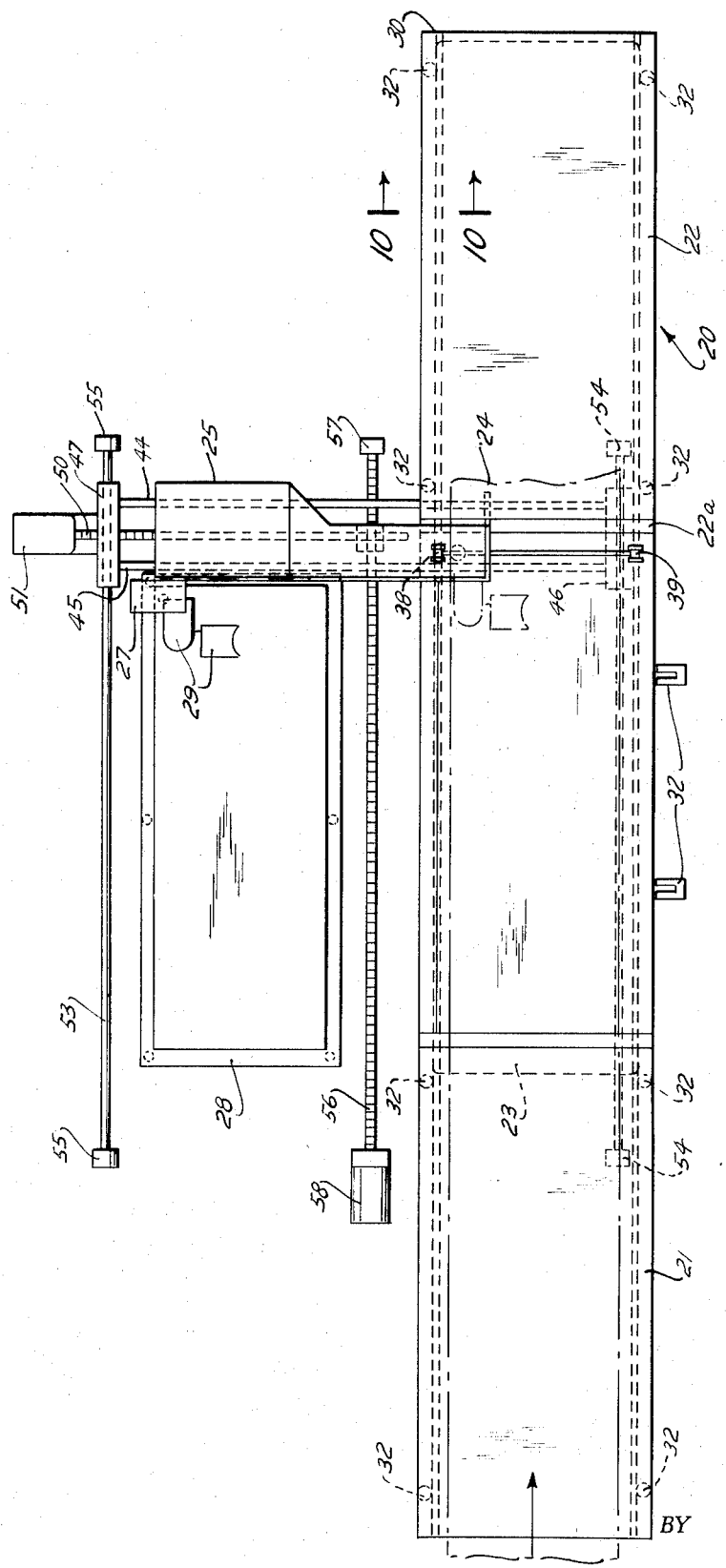
FIG. I

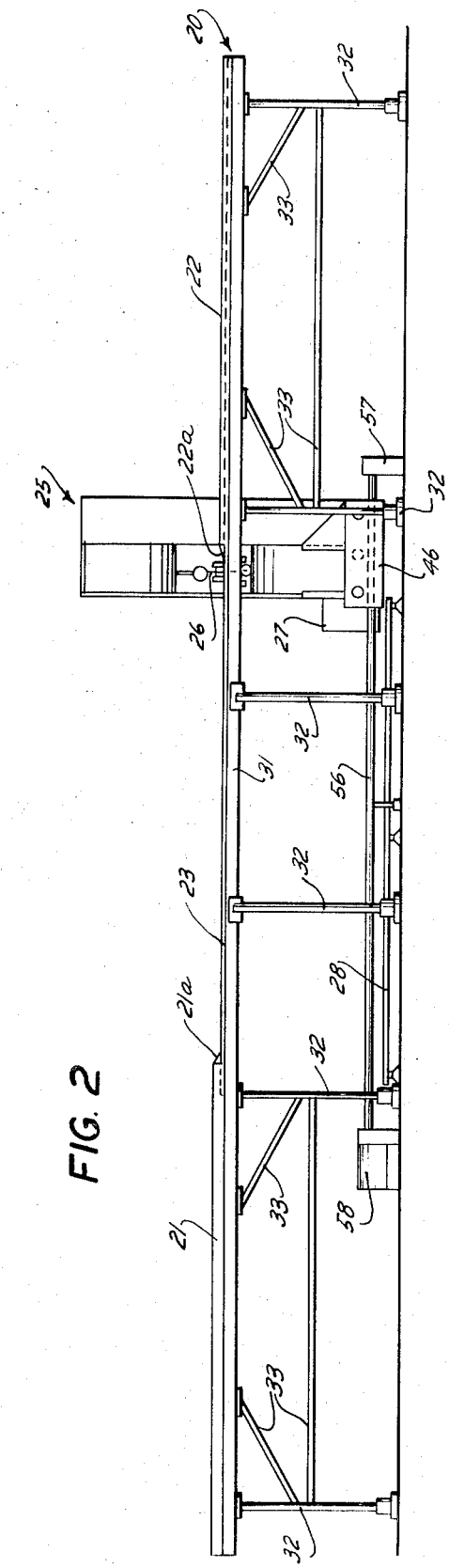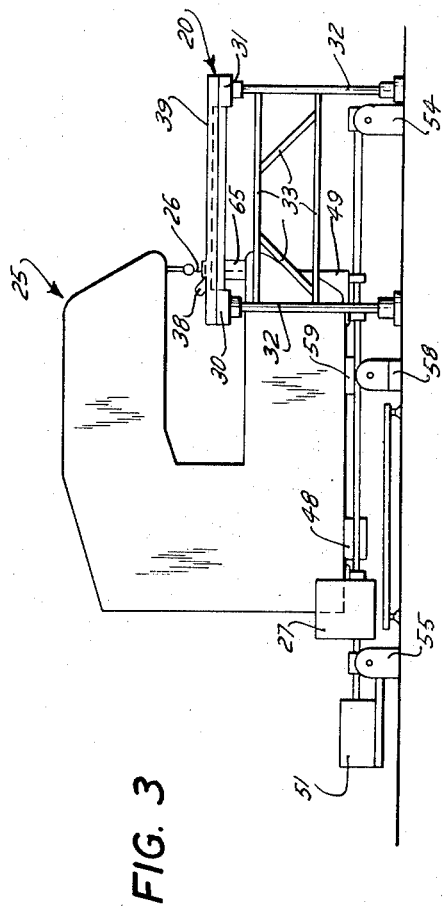

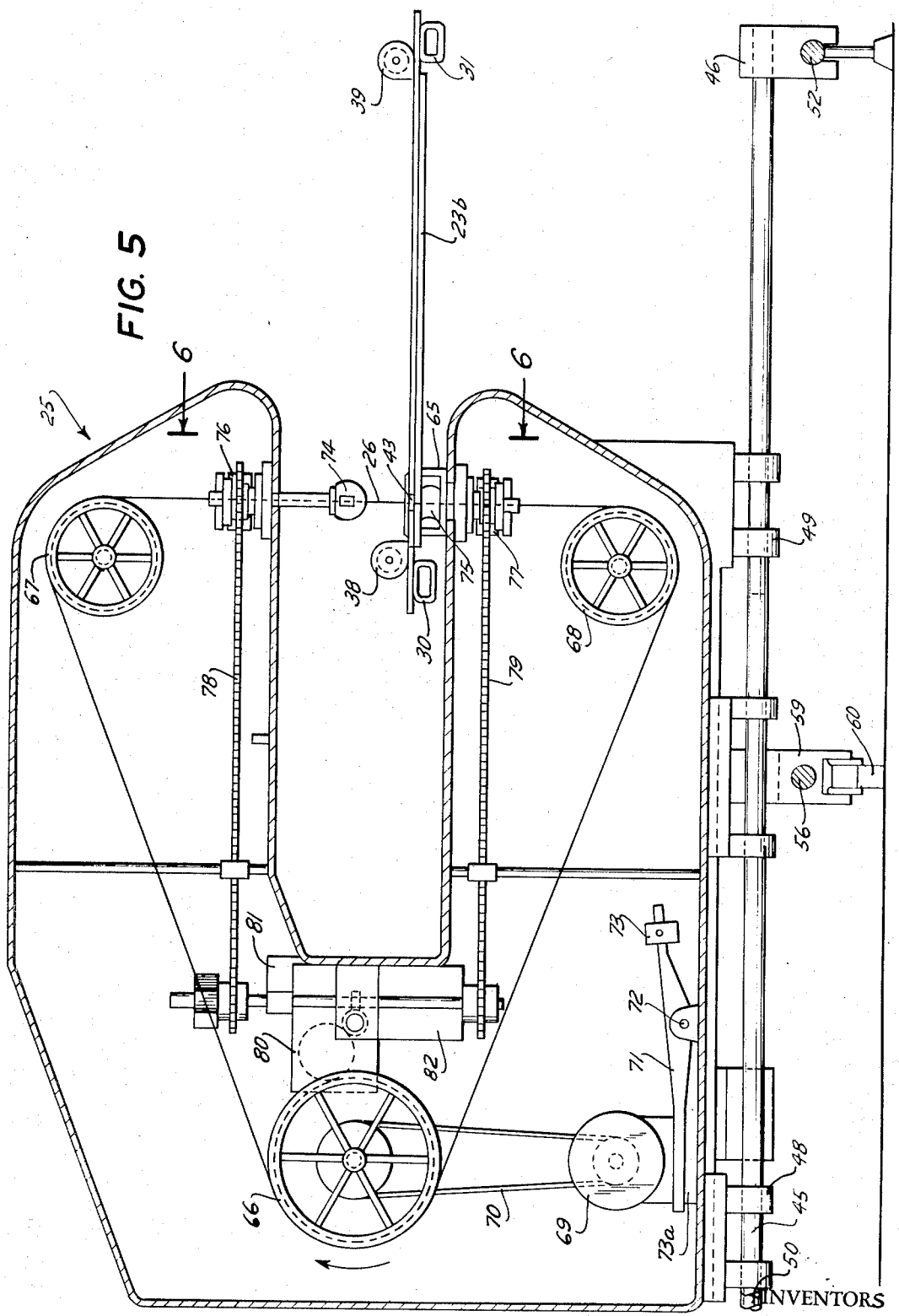

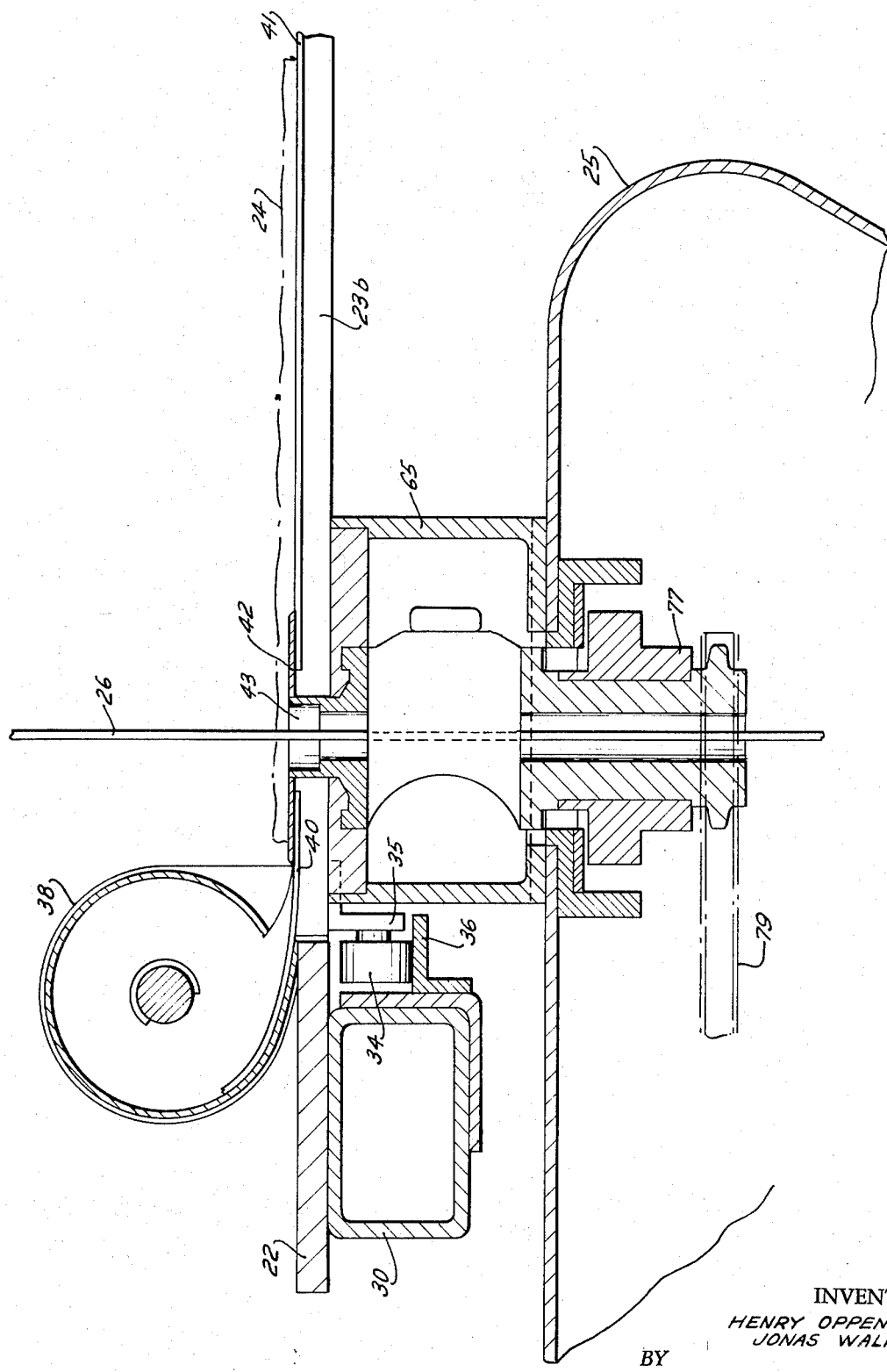

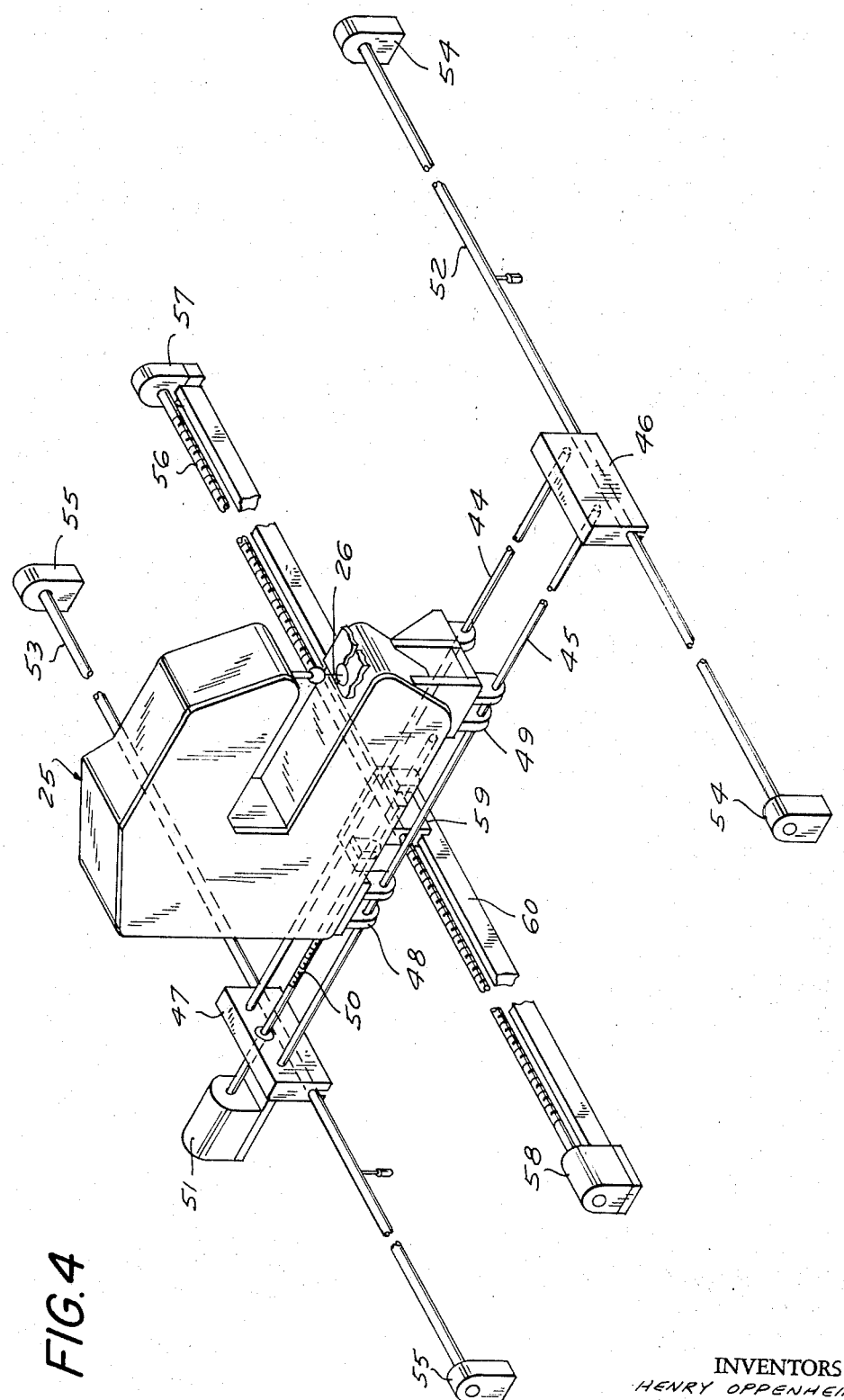

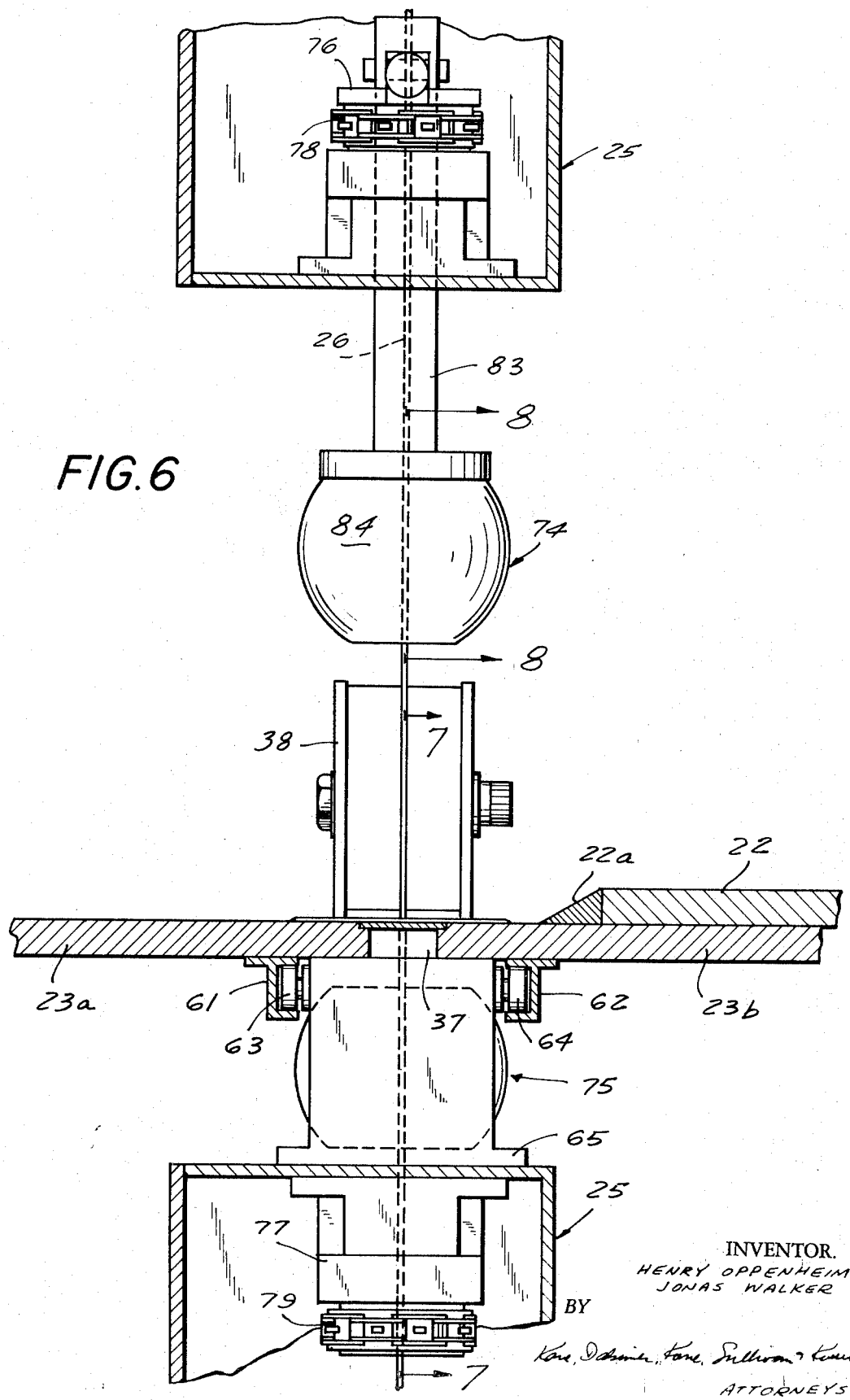

INVENTOR.
HENRY OPPENHEIM
JONAS WALKER
BY
ATTORNEYS

AUTOMATIC MATERIAL CUTTING MACHINE AND METHOD

RELATED APPLICATIONS

This application is a division of Ser. No. 756,271, filed Aug. 29, 1968, now U.S. Pat. No. 3,587,378, which is a continuation-in-part of our prior copending application for U.S. Letters Patent entitled "Automatic Material Cutting Machine" which was filed Oct. 3, 1966 and which bears Ser. No. 583,615 which was a continuation-in-part of our prior application for U.S. Letters Patent entitled "Automatic Material Cutting Machine" which was filed Dec. 9, 1963 and which had Ser. No. 329,022, now abandoned.

BACKGROUND OF THE INVENTION

Cutting devices and methods of various types have been used in the textile industry and other industries to cut substantially flat material into pieces or sections. The devices and methods presently used for such cutting have, for the most part, required marking of the goods to guide the one who will do the cutting requiring large expenditure of time, semi-skilled labor and invariably has resulted in inaccurate cutting and difficulty of duplication. Hence, non-uniformity of pieces, fatigue of workers, waste of material and relatively expensive workmanship has given less than the most desirable performance.

The invention set forth herein is described in the terms of its application to the cutting of textiles. However, it should be understood that the machine and method of the subject invention is applicable to other fields as well and the specific disclosure herein is by way of example only.

This invention is useful for cutting webs and sheets of rigid, semi-rigid, flexible and pliable materials according to predetermined patterns, and for automatically cutting a stack of superposed webs.

This invention provides a machine and method which will, by means of following or tracking accurately translate a drawn line, photograph, template, pattern, or tracing into cut pieces of flat goods.

The invention also allows for the cutting of flat goods in such a way that the pieces cut therefrom can be accurate duplicates of each other and heights of ply or layup of the textile material can be cut.

This invention also provides a machine and method with which flat goods can be accurately cut to a predetermined pattern whether the predetermined pattern be an item to be duplicated or recorded on a magnetic tape or other intelligence storage means.

SUMMARY OF THE INVENTION

The invention consists of a machine and method for automatically cutting web material wherein the material to be cut is supported in slidable engagement with an underlying surface having an opening formed therein and a cutting member projecting through said opening is moved in unison with said underlying surface into cutting engagement with the stationary web material in accordance with remote control signals.

DESCRIPTION OF THE DRAWINGS

FIG. 1 is a plan view of an automatic cutting machine constructed in accordance with the teachings of this invention;

FIG. 2 is a side view of the machine shown in FIG. 1;

FIG. 3 is an end view of the machine shown in FIG. 1;

FIG. 4 is a segmentary perspective view of the cutting means and carriage employed in the machine shown in FIG. 1 with portions of the drive means therefor shown;

FIG. 5 is an enlarged segmentary view from the side of the cutting means and carriage shown in FIG. 4 illustrating the support and drive for the endless cutting element;

FIG. 6 is a partially sectional view taken along the line 6—6 in the direction of the arrows in FIG. 5 showing the cutting element guide means;

FIG. 7 is a partially sectional view taken along the line 7—7 in the direction of the arrows in FIG. 6;

PREFERRED EMBODIMENT

Figure 8:
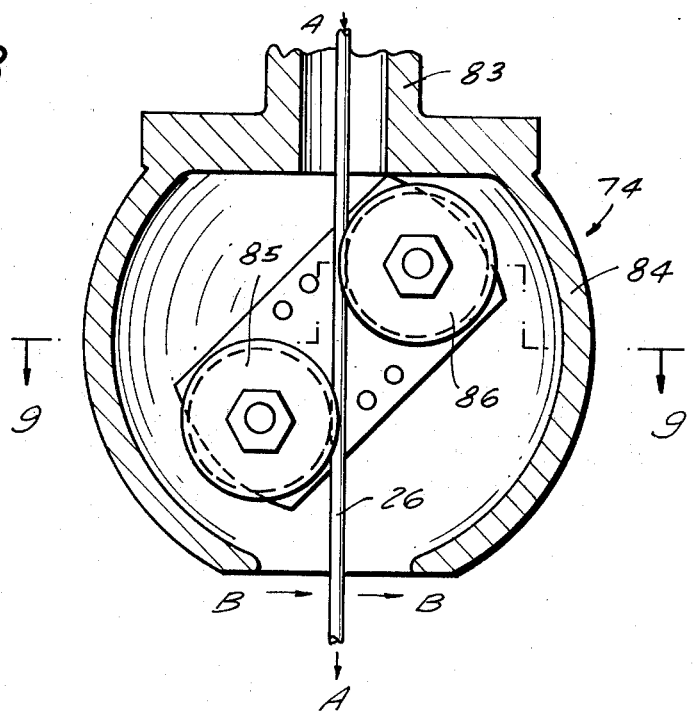
FIG. 8 is a partially sectional view taken along the line 8—8 in the direction of the arrows in FIG. 6.
Figure 9:
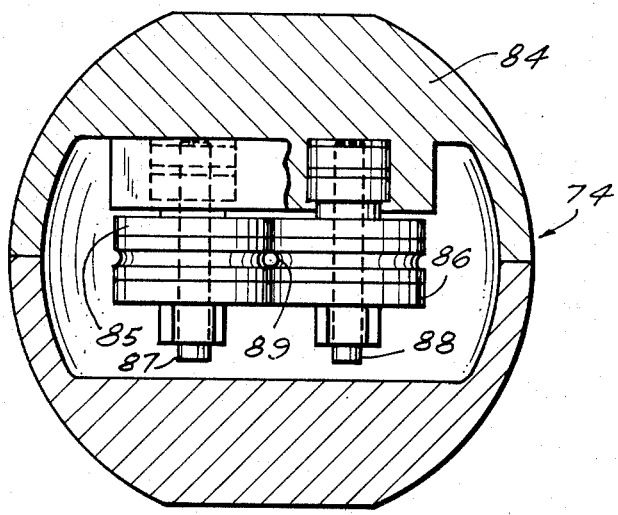
FIG. 9 is a partially sectional view taken along the line 9—9 in the direction of the arrows in FIG. 8.
Figure 10:
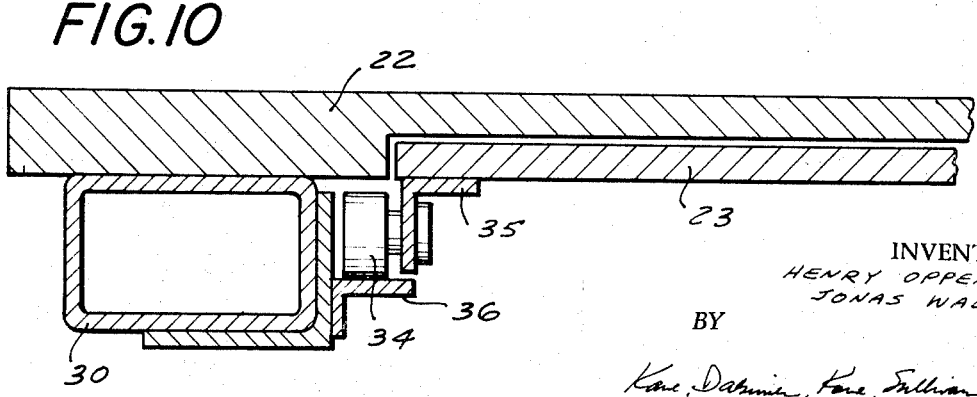
FIG. 10 is a partially sectional view taken along the line 10—10 in the direction of the arrows in FIG. 1 illustrating the support track for the material supporting surface.

The machine as shown in the Figs. contains a table 20 having stationary table sections 21 and 22 and a shiftable section 23 which provides a supporting surface for material 24 (in slidable engagement therewith) and a movable carriage 25 for cutting element 26. In the embodiment shown, a scanner 27 is attached to carriage 25 overlying table 28 to scan pattern 29 disposed thereon providing control signals for the machine. Alternate means of providing signal control to the machine can be used and for specific embodiments may be found more desirable than the embodiment shown in the example in the Figs.

Table 20 is formed by two longitudinally extending spaced beams 30 and 31 suitably supported by stanchions 32 and beams 33. The stationary table sections 21 and 22 are disposed in longitudinal alignment with edges fastened on top of the beams 30 and 31 and spaced from one another a distance slightly less than the length of shiftable table section 23 which has wheels 34 mounted thereto by brackets 35 riding on tracks 36 fastened to respective beams 30 and 31 for longitudinal movement of section 23 beneath the stationary sections.

Edges 21a and 22a of sections 21 and 22 respectively adjacent the center section 23 are formed as inclined planes for a purpose which will be explained below. The center table section 23 is actually in two parts 23a and 23b of identical configuration, slightly spaced, forming opening 37, as seen best in Fig. 6. The edges of parts 23a and 23b are fastened to carriage 25 in such way as to permit carriage 25 to move transversely causing the parts 23a and 23b to move longitudinally as one with the spacing 37 between the two constant or fixed.

Two tape draw rolls 38 and 39 are connected respectively at either end of spacing 37 to the table parts 23a and 23b so that tapes 40 and 41 can each be connected at an end to a respective draw roll 38 or 39 into which it can wind and the free ends of these tapes are connected to bracket 42 spacing the ends so that a minimum opening 43 is provided in the center section 23 through which cutting member 26 can project.

Carriage 25 which is in the configuration of a "C" having its upper portion 25a above and overlying table 20 with its lower portion 25b beneath table 20 is supported for rectilinear movement longitudinally and transversely of table 20 as seen in Fig. 4. Transverse movement is on shafts 44 and 45 supported at their ends by brackets 46 and 47. Shafts 44 and 45 are journalled into brackets 48 and 49 so that the carriage 25 is movable thereon upon turning of screw 50 by servo motor 51. The carriage 25 is arranged for longitudinal movement with brackets 46 and 47 slidably mounted upon shafts 52 and 53 respectively supported by brackets 54 and 55. Screw 56 held at one end by bracket 57 and driven by servo motor 58 provides the power for this movement. Bracket 59 and guide rail 60 are provided to guide the carriage in longitudinal movement.

Spaced facing channel members 61 and 62 extend transversely from the undersides of table parts 23a and 23b adjacent space 37 as seen in FIG. 6 to respectively receive rollers 63 and 64 which ride therein. The rollers are supported by bracket 65 mounted on carriage 25, which bracket also supports bracket 42, as shown in FIG. 7.

Hence movement of carriage 25 longitudinally causes longitudinal movement of the center table maintaining space 37 and movement of the carriage transversely causes transverse movements of the tapes 40 and 41 maintaining the opening 43. The cutting element 26 being supported by carriage 25 and extending in vertical pass between upper and lower portions thereof always projects through opening 43 in the same position.

Carriage 25 is hollow and as shown in FIG. 5, supports three wheels or rollers 66, 67 and 68 which mount and power cutting element 26, the wheels 67 and 68 being arranged so as to direct a vertical run of cutting element 26 perpendicuarly through opening 43. The drive of element 26 is accomplished by use of motor 69, belt 70 and wheel 66. Wheels 67 and 68 are idler wheels.

The motor 69 is set on platform 71 which is pivoted at 72 so the tension in belt 70 can be accurately and finely adjusted by balance weight 73 and tension spring 73a.

In the subject application upper and lower cutting element guide heads 74 and 75 are respectively provided.

The cutting element 26 of the present embodiment is in the form of a circular band, i.e., a blade having a circular cross section. Cutting element guides are provided herein, however, since the blade is quite delicate and such guide as is proposed herein supports the blade, as will appear below. The band guide however can also be used when a blade other than circular is used to direct the cutting edge of the blade.

The cutting element 26 is supported for passage through opening 43 by upper and lower guide heads 74 and 75 which are mounted for rotation about a vertical axis, which axis is the vertical run of cutting element 26. The guide heads are arranged for rotation in unison about the vertical axis by means of gearing 76 and 77 respectively meshing with and being driven by chain drives 78 and 79. A servo motor 80 is provided in carriage 25 for driving chains 78 and 79 in synchronism through respective gear boxes 81 and 82, as seen in FIG. 5.

Each band head guide, as shown in FIGS. 5 through 9, comprises a hollow shaft 83 supporting on its end a substantially spherical housing 84 split along a diametral plane to enable one-half thereof to be removed to give access to the interior of the housing. The housing accommodates a pair of flanged rollers 85 and 86 journalled for free rotation on parallel spindles 87 and 88 and arranged with partly overlapping flanges so as to define between them a passage 89, the gorge of which closely corresponds to the circular cross section and dimensions of the cutting band 26. The guide head 74 is shown in detail in FIGS. 8 and 9 and the guide head 75 is identical therewith.

It is contemplated in this embodiment that the blade movement 26 be downwardly in the direction of the arrow A as shown in FIG. 8, and that the blade engage the material in a cutting motion in accordance with the direction of the arrow B shown in FIG. 8. With this arrangement the heads 74 and 75 will be continually positioned by servo motor 80 so as to have the wheel closest to the material being cut directly behind the cutting blade, thereby supporting it. Hence, for example, in FIG. 8 the upper guide would be positioned to have wheel 85 in the position shown.

In operation the material 24 which is to be cut is laid on the table with at least an edge thereof on the center table 23 to be supported thereby in slidable engagement with the table 23, and the cutting element 26 is moved into engagement with material 24 in response to remote control signals operating servo motors 51 and 58. Initially the cutting element can enter the web through a predrilled hole. The same remote signals can be utilized to control servo motor 80, and if desired, actuate cutting element power motor 69 as well. The movement of the carriage 25 in response to the signals also moves the underlying surface of center table section 23 to maintain the position of opening 43 through which the cutting element 26 projects. Operation of servo motor 80 directs the cutting element heads 74 and 75 in accordance with the above description to provide additional support to the cutting element in order to avoid bowing.

In the present embodiment the control signals are derived by scanner 27 sensing the outline of the patterns 29. The outline of the patterns 29 is sensed and the signals transmitted to the servo motors. It is contemplated that the carriage 25 can be moved by hydraulic cylinders by use of hydraulic motors and suitable controls. Other means for powering the carriage 25 can, of course, be utilized.

Figure 11:
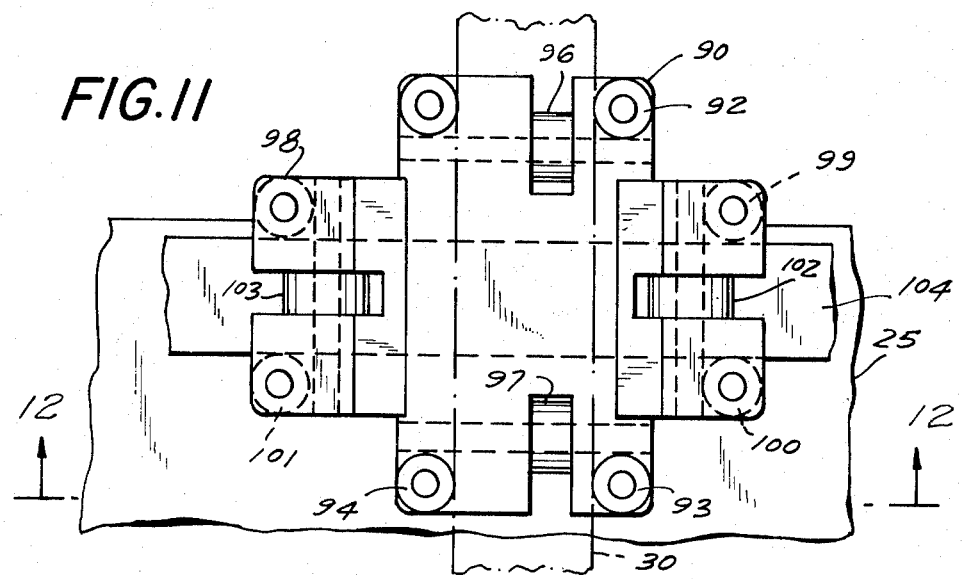
FIG. 11 is a partially sectional view from above of a table support member utilized in a modification of the invention.
Figure 12:
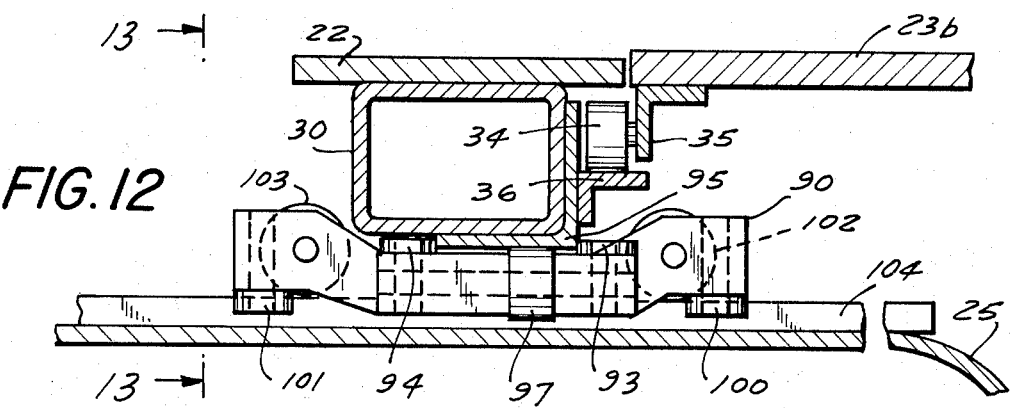
FIG. 12 is a partially sectional view taken along the line 12—12 in the direction of the arrows in FIG. 11.
Figure 13:
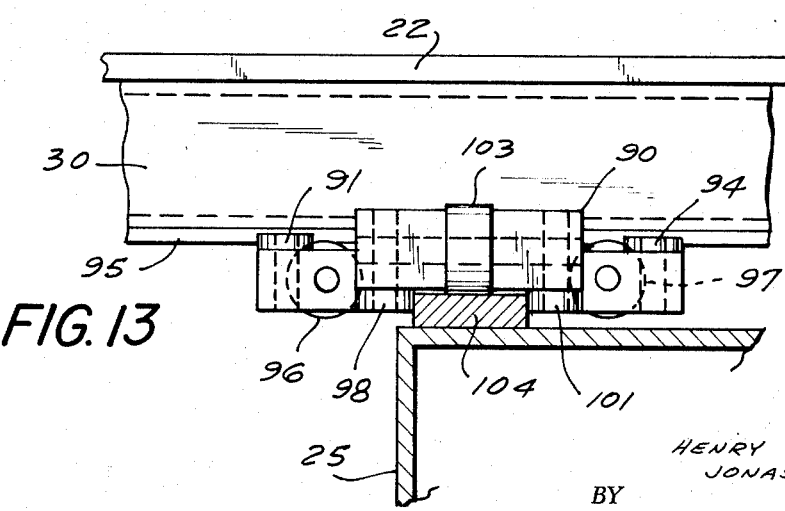
FIG. 13 is a partially sectional view taken along the line 13—13 in the direction of the arrows in FIG. 12.

In FIGS. 11, 12 and 13 a modification is shown. This modified embodiment is substantially identical to the embodiment previously shown and described. However, an additional member 90 is utilized. Member 90 is referred to herein as a table support member and is shown in FIGS. 12 through 13. Table support member 90 is a substantially flat member which is provided with four longitudinal guide rolls 91, 92, 93 and 94 which cooperate with horizontal channel member 95 which is attached to the lower portion of beam 30 on the side near the vertical portion of movable carriage 25. The longitudinal guide rolls 91, 92, 93 and 94 serve to position support member 90 during longitudinal movement of the member with horizontal channel member 95 serving as a longitudinal track. Table support rolls 96 and 97 cooperate with member 95 to allow the support member 90 to move with movable carriage 25 longitudinally, as will appear below. The table support member 90 is also provided with transverse guide rolls 98, 99, 100 and 101 which allow the carriage 25 to move transversely of the table on table support rolls 102 and 103 as the transverse guide rolls embrace channel member 104 supported upon the carriage 25.

The table support member 90 therefore provides support for the table as the carriage 25 is shifted longitudinally and transversely. Hence in FIG. 5 it is seen that the channel 30 is "floating." With the addition of table support member 90 a member is provided between the surface of carriage 25 beneath the table and channel 30. As the carriage 25 is moved transversely of the table the table support member 90 remains in position and the carriage moves with respect thereto due to the action of the transverse guide rolls 98, 99, 100 and 101 and rollers 102 and 103 on channel 104.

As the carriage 25 is moved longitudinally the table support member 90 moves therewith due to the action of the longitudinal guide rolls 91, 92, 93, 94 and rolls 96 and 97 with respect to member 95. Hence a support is provided between the carriage and the table at all times.

At all times the underlying surface and the cutting element are moved relative to the material being cut. It is contemplated that the weight of the material being cut will maintain it in substantially fixed position in space and an end of the material can be laid on one of the stationary portions of the support table if desired. Additionally, suitable clamping means along the edges of the table can be utilized so that the movement is of the cutting element and underlying surface with respect to a substantially motionless web member 24.

The signal input can be any suitable means such as tapes, etc. and if a sensing device is used it can be in the form of an optical follower, such as a device of the type shown in U.S. Pat. No. 3,024,396.

We claim:

1. A method of automatically cutting substantially flat material into patterns by cutting means automatically responsive to predetermined indicia which comprises:
   a. supporting the material to be cut in patterns upon a substantially horizontal surface with horizontally slidable engagement between said material and said surface,
   b. providing an opening in said surface, said opening being defined by a perimeter which is at least in part fixed relative to said surface,
   c. moving a cutting element substantially vertically through said opening,
   d. horizontally moving said cutting element responsive to predetermined indicia along a path having a vector longitudinal of said material and a vector transverse of said material, a vertical edge of said cutting element engaging said material during said horizontal movement, and
   e. moving said opening to follow the path of movement of said cutting element by sliding movement of said surface beneath said material.

2. A method as claimed in claim 1 wherein said material is maintained stationary at least in the horizontal plane throughout said combined movements of said cutting element and said surface.

3. A method as claimed in claim 1 wherein said cutting element is a continuous flexible band and the band is moved in a downward path through said opening toward said material.

4. A method as claimed in claim 3 wherein said band moves in said downward path between a positioning element held above said surface and a positioning element held below said surface.

5. A method as claimed in claim 4 wherein the holding of said positioning elements is automatically controlled during the movement of said cutting element to apply to the cutting element a force vector that remains substantially tangent to the cut being created in the material by movement of the cutting element.

* * * * *